United States Patent [19]
Boyd

[11] Patent Number: 5,864,129
[45] Date of Patent: Jan. 26, 1999

[54] BAR CODE DIGITIZER INCLUDING A VOLTAGE COMPARATOR

[75] Inventor: Raymond J. Boyd, Bloomfield, N.Y.

[73] Assignee: PSC Inc., Webster, N.Y.

[21] Appl. No.: 841,807

[22] Filed: May 5, 1997

[51] Int. Cl.$^6$ .................................................. G06K 7/10
[52] U.S. Cl. .............................................................. 235/462
[58] Field of Search ............................ 235/462; 327/68, 327/70, 72

[56] References Cited

U.S. PATENT DOCUMENTS

| | | | |
|---|---|---|---|
| 5,103,080 | 4/1992 | Barkan | 235/437 |
| 5,200,597 | 4/1993 | Eastman et al. | 235/467 |
| 5,210,397 | 5/1993 | Eastman | 235/462 |
| 5,298,729 | 3/1994 | Elliott et al. | 235/463 |
| 5,307,196 | 4/1994 | Kinoshita | 327/72 |
| 5,382,783 | 1/1995 | Bremer | 235/462 |
| 5,446,272 | 8/1995 | Barkan | 235/462 |
| 5,463,211 | 10/1995 | Arends et al. | 235/462 |
| 5,581,072 | 12/1996 | Bridgelall et al. | 235/462 |
| 5,619,028 | 4/1997 | Barkan | 235/462 |
| 5,682,028 | 10/1997 | Coleman | 235/462 |

*Primary Examiner*—Anita Pellman Gross
*Assistant Examiner*—Diane I. Lee
*Attorney, Agent, or Firm*—Foley & Lardner

[57] ABSTRACT

A digitizer for a barcode scanner includes an amplifier and a comparator. The amplifier receives a feedback signal and a differentiated return signal on a first port, and a reference voltage signal on a second port. Based on a difference between voltages on the first and second ports, the amplifier outputs an output signal, which is limited between a maximum voltage value and a minimum voltage value. The output signal is delayed in phase, and the phase-delayed signal is input to a first port of a comparator, while the undelayed output signal is input to a second port of the comparator. Based on a comparison of the voltages on the first and second ports of the comparator, the feedback signal having one of a first voltage value and a second voltage value is obtained.

22 Claims, 6 Drawing Sheets

BAR CODE DIGITIZER INCLUDING A VOLTAGE COMPARATOR

BACKGROUND OF THE INVENTION

1. Field of the Invention

The present invention relates to a digitizer for a bar code scanner. More particularly, the present invention relates to a digitizer for a bar code scanner, which is capable of inhibiting improper transitions of an input differentiated signal to be digitized by the digitizer.

2. Description of the Related Art

Bar codes are used in a wide variety of applications for retrieving information, such as price, from objects. In this respect, bar code scanners are of widespread use in grocery stores and department stores, for both inventory control and for point-of-sales transactions.

A bar code normally includes several bar code characters. A bar code character is a group of lines (bars) and spacings that represent a single number or letter. A bar code symbol is a collection of several bar code characters which represent an identification of a particular object. The lines of the bar code can vary, for example, in a range from about ⅛" to 1" in height, and from about 1 to 50 mils in thickness. The spacings between the lines of the bar code symbol may be of various widths, with the variations in the spacing being one indication of the type of bar code characters making up the bar code symbol.

Typically, bar codes are read by a bar code scanner by illuminating the bars and spacings in a sequential manner (i.e., scanning), with the bars absorbing light and the background spacings reflecting light. This results in a pattern of reflections and nonreflections that is sensed by a light detecting circuit resident in the bar code scanner. The light detecting circuit provides an input to a digital processor, which interprets this input into a digital word.

One important aspect of bar code scanners is the means that performs scanning of a bar code symbol. In particular, hand-held bar code scanners typically require a miniaturized scanning means that can fit within the housing of the bar code scanner. The term "scan engine" or "scan module" used herein may be taken to mean a unitary assembly of a light beam source, and optical and electronic components for collecting and translating light received from a symbol (e.g., a bar code) into data-representing electrical signals. All bar code scanners require a scan module, as well as a means for providing oscillation of the scan module so as to provide a scanning function.

Conventional bar code scanners also utilize laser diodes in order to provide the means for outputting coherent light towards an object to be scanned. The laser diode is typically affixed to the oscillation means, and so provides a sweeping of light across an object that is scanned.

Another important part of a bar code scanner is the signal processing circuitry, which is used to detect and decode the return light in order to output a digital signal representative of the scanned bar code symbol. FIG. 1 shows a conventional signal processor for a bar code scanner. The return light from a scanned bar code symbol is received by a photodetector 100, which converts the received light into a current value. The current value is sent to a transimpedance amplifier 110, which converts the current value into a voltage value. The voltage value is input to an amplifier stage 120, which provides a constant gain to the voltage value.

The amplified voltage output from the amplifier stage 120 is sent to a derivative circuit 130, which performs a first (and sometimes also a second) derivative function on the voltage value, in order to enhance transitions in the amplified voltage output which correspond to dark bar edges and white space edges of the scanned bar code symbol.

The output of the derivative circuit 130 is sent to a filter stage 140, which typically has a fixed bandwidth. The bandwidth characteristics of the filter stage 140 are set based on the typical scanning range of the bar code scanner, as well as the typical bar widths that are to be scanned by the bar code scanner. Once the bandwidth characteristics of the filter stage 140 are set (during the manufacturing of the bar code scanner), they cannot be adjusted during operation of the bar code scanner.

The output of the filter stage 140 is sent to a digitizer stage 150, which has a particular threshold associated therewith, so as to detect portions of the return signal that are above the particular threshold. Based on these detections, the widths of the bars (i.e., those portions of the return signal that are above the particular threshold) and the widths of the spaces of the scanned bar code symbol can be determined. Some conventional barcode scanners provide a connection directly from the derivative circuit 130 to the digitizer stage 150, without providing any filtering therebetween.

In conventional systems, there is a problem associated with false detections of bar and space edges due to noise spikes. Several types of systems have been devised to help alleviate this problem.

U.S. Pat. No. 5,382,783, issued to Edward Bremer, and assigned to PSC Inc., which is incorporated herein by reference, discloses a false bar code inhibitor circuit, as shown in FIG. 2. The false bar code inhibitor circuit 100 includes a detector circuit 52, a signal restore circuit 54, an externally adjustable threshold comparator circuit 56, a software controller 58, and a high impedance clamp circuit 60. With this system, a window for a bar code read is dynamically set each time, and with the window the bar code reader is able to mask false bars in the output bar code from the digitizer.

U.S. Pat. No. 5,103,080, issued to Edward Barkan, and assigned to Symbol Technologies, Inc., discloses a digital signal processing circuit for a bar code scanner, as shown in FIG. 3. The circuit includes a amplifying circuit 16 for amplifying a differentiated signal, a delay circuit 18 for producing a delayed signal, a peak locating comparator 20 for comparing the differentiated signal to the delayed signal. The circuit also includes a peak comparator 20 and a false transition gating comparator 22, whereby a latch comparator circuit 24 only changes state upon the first transition of the peak comparator 20 following a transition of the gating comparator 22. In this way, noise that may cause spurious transitions on the output of the peak location comparator 20 do not cause false transitions on the latch comparator 24 output unless the noise is large enough to trip the gating comparator 22.

U.S. Pat. No. 5,298,728, issued to Randy Elliott and Blaine Loris, and assigned to Spectra-Physics Scanning System, Inc., which is incorporated herein by reference, discloses a signal processing apparatus for use in barcode scanners. The apparatus forms a derivative signal, and utilizes the derivative signal to detect transition points from white to black bars and vice versa. The apparatus then starts and stops the generation of digital pulses at or about the transition points, so as to generate pulses having widths corresponding to the widths of the bars making up the bar code symbol.

U.S. Pat. No. 5,446,272, issued to Edward Barkan, and assigned to Symbol Technologies, Inc., discloses a system for digitizing a return signal from a scanned barcode symbol. The system detects zero-crossings of a second derivative signal, and ignores noise signals from a first derivative of the return signal.

In all of the above-mentioned systems, a certain amount of noise will cause a false transition on the differentiated signal, which will be subsequently digitized to produce an incorrect digitized output.

SUMMARY OF THE INVENTION

An object of the invention is to provide a digitizer for a barcode scanner, which can ignore false transitions of an input differentiated signal.

Another object of the invention is to provide a restore-to-white function for a digitizer for a barcode scanner.

Still another object of the invention is to provide a full peak-to-peak voltage swing capability for a digitizer for a barcode scanner.

To achieve these and other objects, there is provided a digitizer for a barcode scanner. The barcode scanner includes a detector configured to receive a return signal from a scanned barcode symbol, and to output a signal indicative of the return signal. The barcode scanner also includes a differentiator circuit configured to provide a differentiated signal based on the return signal. The digitizer includes an amplifier having a first input port configured to receive a reference voltage, and a second input port configured to receive the differentiated signal and a feedback signal. The amplifier includes an output port for providing an output signal based on a difference between the reference voltage and a sum signal, whereby the sum signal corresponds to the feedback signal added to the differentiated signal. The amplifier is configured to provide a maximum voltage as the output signal when the reference voltage is greater than the sum signal by at least a predetermined voltage, and the amplifier is configured to provide a minimum voltage as the output signal when the reference voltage is less than the sum signal by at least the predetermined voltage.

The digitizer also includes a comparator having a first port configured to receive the output signal and a second port connected to receive a filtered signal. The filtered signal is provided by a filter connected between the output port of the amplifier and the second port of the comparator, and which provides the filtered signal based on the output signal being input to the filter.

Based on whether the filtered signal is greater than the output signal or whether the output signal is greater than the filtered signal, the comparator outputs one of two voltage levels as the feedback signal.

In another embodiment, a restore-to-white circuit is connected between an output port of the comparator and the second port of the comparator.

The above-mentioned objects and other objects are also accomplished by a digitizer for a barcode scanner, in which the barcode scanner includes a detector configured to receive a return signal from a scanned barcode symbol, and to output a signal indicative of the return signal, and in which the barcode scanner further includes a differentiator circuit configured to provide a differentiated signal based on the return signal. The digitizer includes a limiter circuit having a first input port configured to receive a reference voltage, and a second input port configured to receive the differentiated signal and a feedback signal, the limiter circuit including an output port for providing an output signal based on a difference between the reference voltage and a sum signal, the sum signal corresponding to the feedback signal added to the differentiated signal. The limiter circuit is configured to provide a maximum voltage as the output signal when the reference voltage is greater than the sum signal by at least a predetermined voltage, and the limiter circuit is configured to provide a minimum voltage as the output signal when the reference voltage is less than the sum signal by at least the predetermined voltage. The digitizer also includes a filter coupled to receive the output signal from the limiter circuit and configured to provide a filtered signal. The digitizer further includes a comparator having a first port configured to receive the output signal from the limiter circuit and a second port connected to receive the filtered signal from the filter. Based on a comparison of an amplitude of the filtered signal and an amplitude of the output signal, the comparator outputs one of a first and second voltage level as the feedback signal.

The above-mentioned objects and other objects are also accomplished by method for digitizing a differentiated return signal from a scanned barcode symbol. The method includes a step of subtracting a reference signal from a sum signal in order to obtain an output signal, the sum signal corresponding to the differentiated return signal added to a feedback signal, the output signal being limited to a value between a maximum value and a minimum value. The method also includes a step of phase delaying the output signal in order to obtain a phase-delayed signal. The method further includes a step of comparing the phase-delayed signal to the output signal in order to output the feedback signal having one of a first signal level and a second signal level. With this method, improper transitions of the differentiated return signal are ignored and not digitized due to the feedback signal forcing the output signal to one of the maximum value and the minimum value.

BRIEF DESCRIPTION OF THE DRAWINGS

The above-mentioned objects and advantages of the invention will become more fully apparent from the following detailed description when read in conjunction with the accompanying drawings with like reference numerals indicating corresponding parts throughout, and wherein.

DETAILED DESCRIPTION OF THE PREFERRED EMBODIMENT

Figure 1:
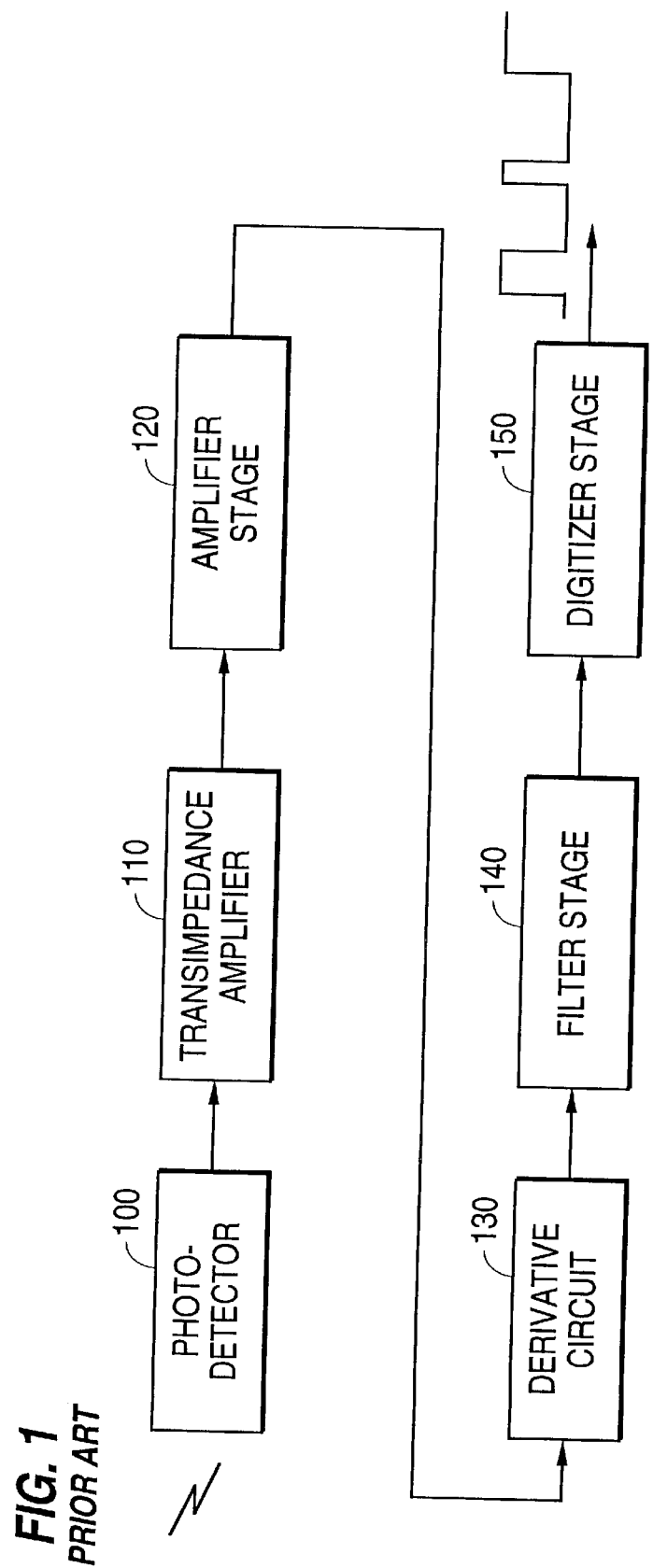
FIG. 1 is a diagram of a conventional signal processor for use in a bar code scanner.
Figure 2:
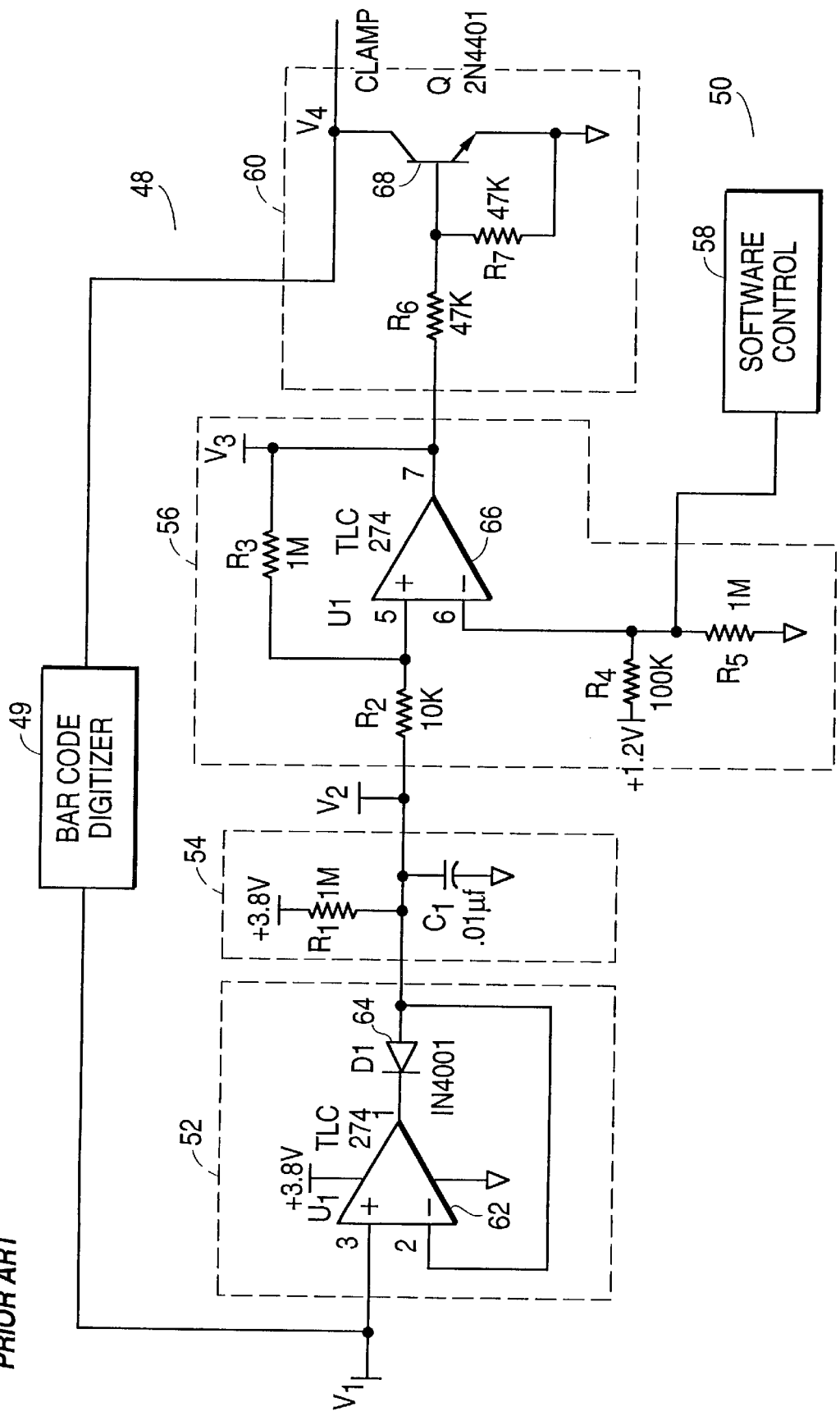
FIG. 2 is a diagram of a first conventional digitizer for use with a barcode scanner.
Figure 3:
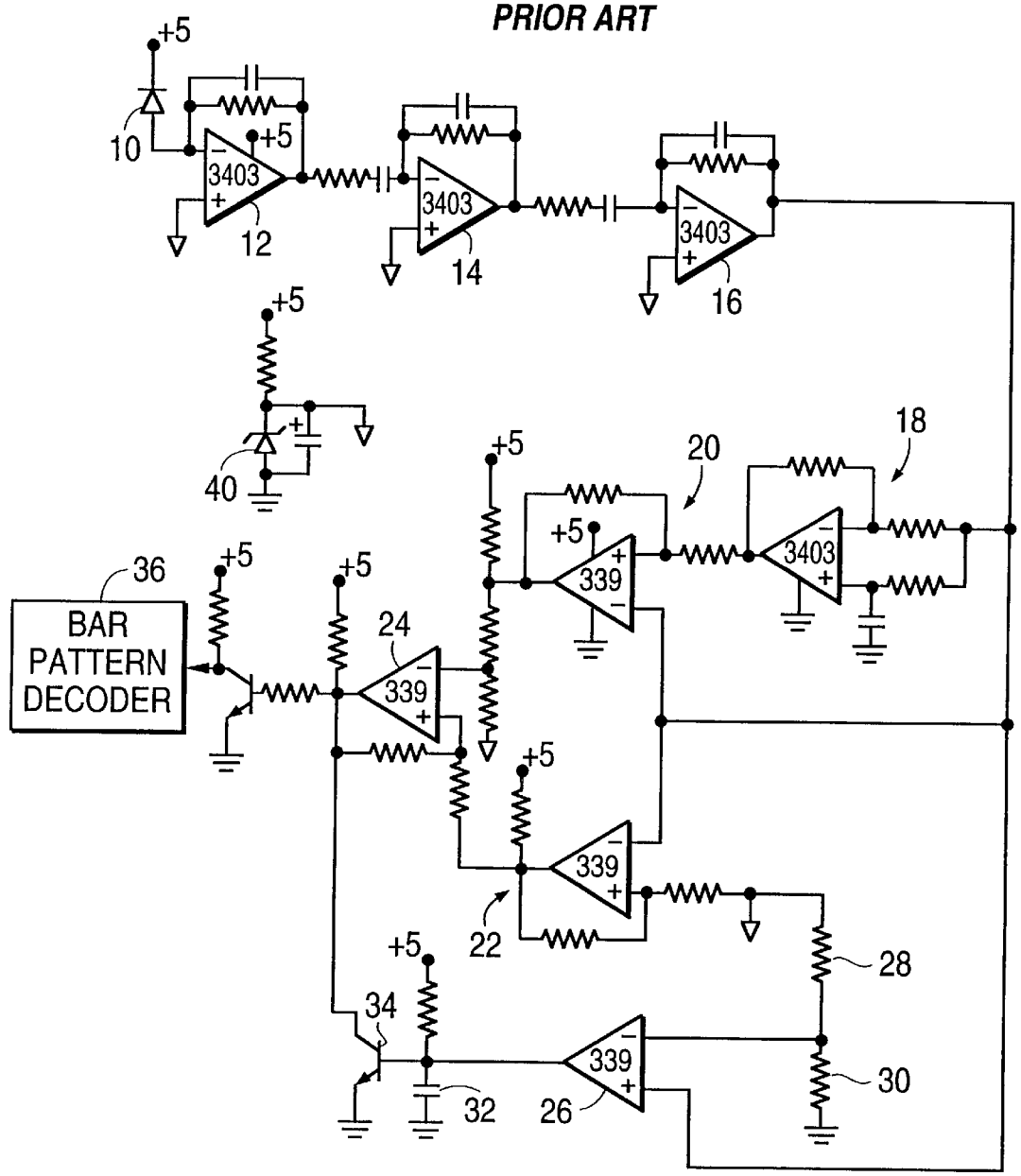
FIG. 3 is a diagram of a second conventional digitizer for use with a barcode scanner.
Figure 4:
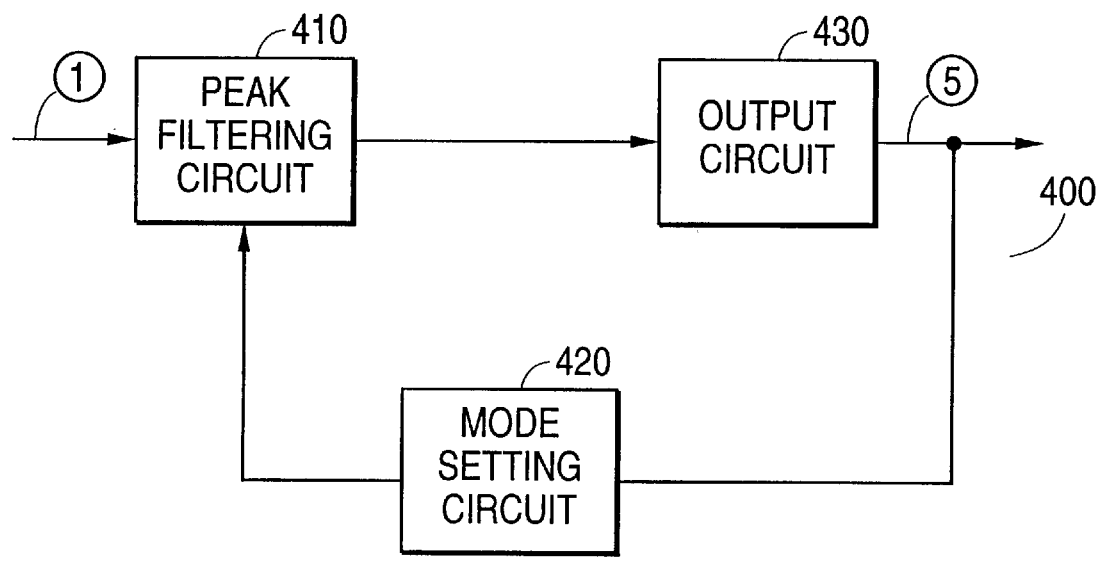
FIG. 4 is a block diagram of a barcode digitizer according to a preferred embodiment of the invention.

A preferred embodiment of the invention will be discussed in detail with reference to FIGS. 4 through 6. FIG. 4 shows a block diagram of a digitizer 400 according to the preferred embodiment of the invention. The digitizer 400 includes a peak filtering circuit 410, which receives a differentiated signal, similar to waveform (1) shown in FIG. 6. The peak filtering circuit 410 is configured to operate in either a first mode or a second mode, based on a control signal sent to the peak filtering circuit 410 by a mode setting circuit 420.

Figure 6:
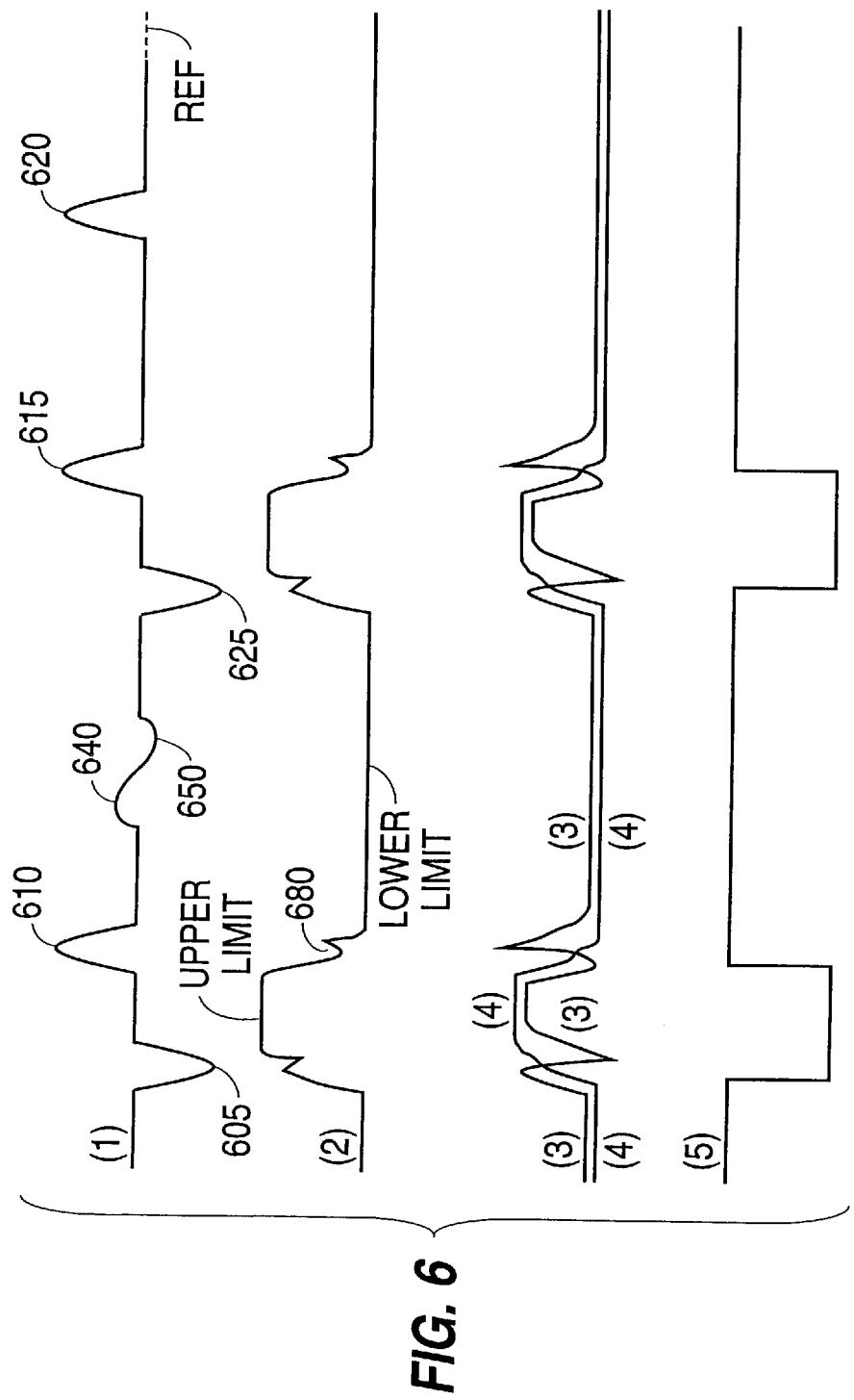
FIG. 6 is a timing diagram of the signals provided by the barcode digitizer according to the invention.

In the first mode, the peak filtering circuit 410 is responsive to an initial transition of a first polarity in the differentiated signal (i.e., waveform (1) of FIG. 6), and it ignores subsequent transitions of the first polarity. In the second mode, the peak filtering circuit 410 is responsive to an initial transition of a second polarity and ignores subsequent transitions of the second polarity.

The digitizer 400 includes an output circuit 430, which provides a digitized output (i.e., waveform (5) of FIG. 6). The mode setting circuit 420 is connected to receive the digitized output from the output circuit 430. The mode setting circuit 420 switches the peak filtering circuit 410 between the first and second modes in accordance with a high-to-low or low-to-high transition of the digitized output.

Thus, referring now to FIG. 6, in an initial state (i.e., power up), the differentiated signal is at a reference level REF, and the output of the digitizer is at a high state. The first transition of waveform (1) is a negative transition, indicated by 605. This transition is filtered through by the peak filtering circuit 410, and then digitized by the output circuit 430, causing the digitized output waveform (5) to be set to a low state. The mode setting circuit 420 detects the switch from the high state to the low state of the output waveform (5), and sets the peak filtering circuit 410 to a first mode. In the first mode, a subsequent negative transition (with no positive transitions in between) will be filtered out by the peak filtering circuit 410, and thus will not appear at the output of the peak filtering circuit 410.

Since the next transition of waveform (1) is a positive transition, indicated by 610, that transition will be filtered through by the peak filtering circuit 410, and subsequently digitized by the output circuit 430, causing the output waveform (5) to transition from the low state to the high state. This low-to-high transition of the output waveform (5) will be detected by the mode setting circuit 420, which will set the peak filtering circuit 410 to a second mode. In the second mode, a subsequent positive transition (with no negative transitions in between) will be filtered out by the peak filtering circuit 410, and thus will not appear at the output of the peak filtering circuit 410.

Transitions 640 and 650 are due to noise, and are filtered out by the peak filtering circuit 410 since they do not exceed a predetermined magnitude. The next transition, indicated by 625 in FIG. 6, is a negative transition. Since the peak filtering circuit 410 is in the second mode, transition 625 is filtered through by the peak filtering circuit 410 and subsequently digitized by the output circuit 430, resulting in waveform (5) transitioning from the high state to the low state. This high-to-low transition of the output waveform (5) will be detected by the mode setting circuit 420, which will set the peak filtering circuit 410 to the first mode.

Since the next transition of waveform (1) is a positive transition, indicated by 615, that transition will be filtered through by the peak filtering circuit 410, and subsequently digitized by the output circuit 430, causing the output waveform (5) to transition from the low state to the high state. This low-to-high transition of the output waveform (5) will be detected by the mode setting circuit 420, which will set the peak filtering circuit 410 to the second mode. Since the peak filtering circuit 410 is in the second mode and since the next transition of the waveform (1) is a positive transition, indicated by 620 in FIG. 6, transition 620 will be filtered out by the peak filtering circuit 410. Note that transition 620 is a false transition, since in a true barcode symbol, there is never a situation where two or more positive transitions or two or more negative transitions in the differentiated output signal would ever occur consecutively.

Figure 5:
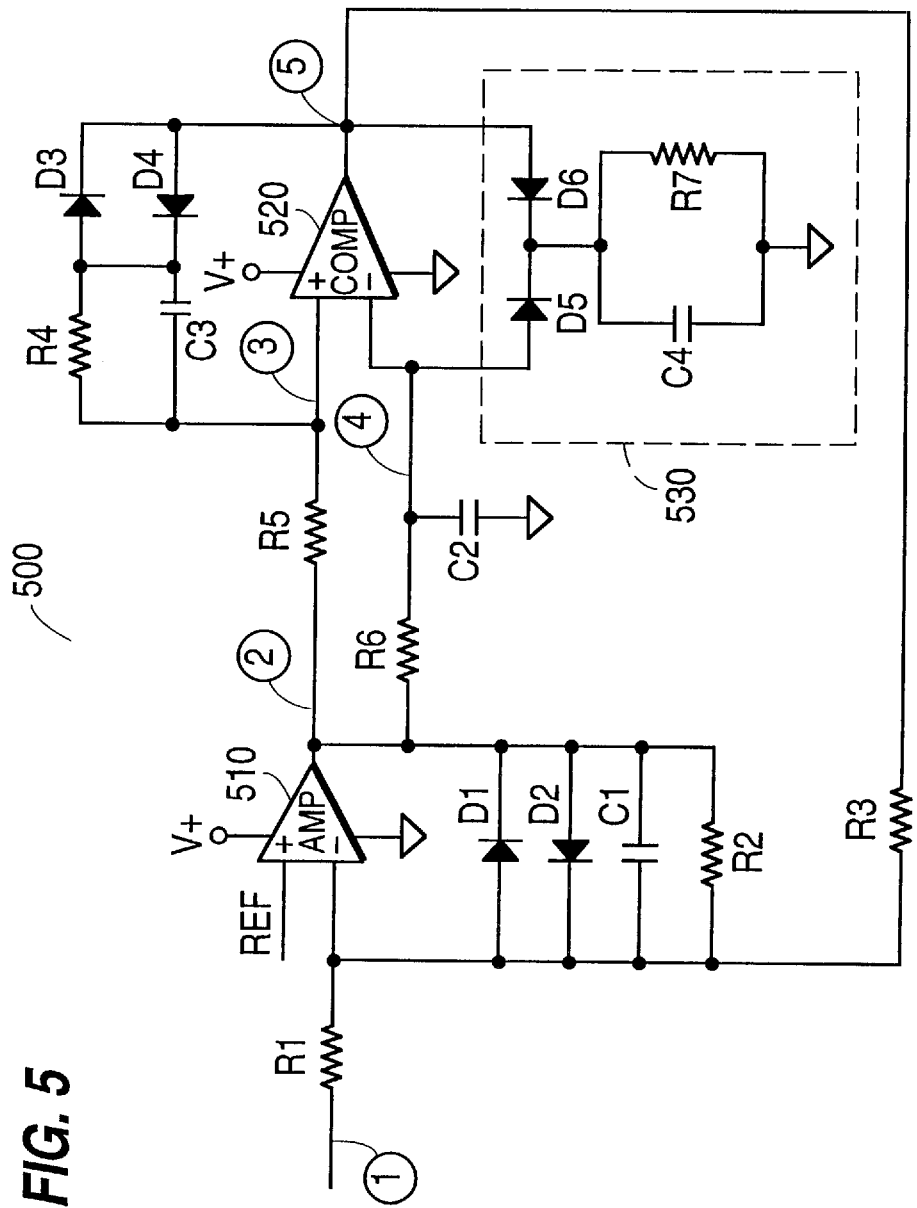
FIG. 5 is a circuit diagram of a barcode digitizer according to the preferred embodiment of the invention.

FIG. 5 shows a detailed circuit diagram of a digitizer 500 for use with a barcode scanner according to the invention. The digitizer 500 includes an amplifier 510 and a comparator 520. Connected between the output of the amplifier 510 and the inverting input port of the amplifier 510 are a capacitor C1, resistor R2, diode D1, and diode D2, all being in a parallel relationship with respect to each other. Connected between the output of comparator 520 and the noninverting input port of comparator 520 is a combination which includes a capacitor C3 in parallel to a resistor R4, connected in series to a pair of parallel-connected, oppositely positioned diodes D3 and D4. A restore-to-white circuit 530 is connected between the output of comparator 520 and the inverting input port of comparator 520. The restore-to-white circuit 530 includes a diode D5, a diode D6, a resistor R7, and a capacitor C4. A resistor R3 is provided between the output of comparator 520 and the inverting input port of amplifier 510. Connected between the amplifier 510 and the comparator 520 are a resistor R5, a resistor R6 and a capacitor C2.

In FIG. 5, the amplifier 510 and the assorted components connected between its input and output ports correspond to the peak filtering circuit 410 of FIG. 4, the comparator 520 and the assorted components connected between its input and output ports correspond to the output circuit 430 of FIG. 4, and the feedback path which includes resistor R3 corresponds to the mode setting circuit 420 of FIG. 4.

The digitizer 400/500 provides 2:1 noise reduction over conventional digitizers and up to two times the peak-to-peak signal range over conventional digitizers. In addition, the digitizer 400/500 does not require any additional bar validation circuitry, and the digitizer 400/500 provides a bar validation on every transition, as well as providing a restore-to-white function and a noise threshold.

Referring now to FIG. 5 and FIG. 6, waveform (1) is input to the inverting input port of the amplifier 510. Waveform (1) corresponds to a standard differentiated barcode analog signal, where the peaks of the signal represent black and white transitions. More particularly, a negative spike on waveform (1) is indicative of a white-to-black transition, and a positive spike on waveform (1) is indicative of a black-to-white transition. Waveform (1) swings above and below a reference level, which, in the preferred embodiment, is set at 2.5 volts. Of course, other reference levels can be set while remaining within the scope of the invention.

Barcode output waveform (5) begins in the high (white) state. This is an initial state that is set by the restore-to-white circuit. By having waveform (5) set to the high state, the first white-to-black transition of a scanned barcode label can be properly detected and digitized.

Waveform (5) is used to offset the output of amplifier 510 into a lower limit value when waveform (5) is in the high state. That is, amplifier 510 outputs a signal based on a difference between voltages at its respective inverting and non-inverting input ports. In the preferred embodiment, a reference voltage (set at, for example, 2.5 volts), is input to the non-inverting input port of the amplifier 510.

When the reference signal at the non-inverting input port of amplifier 510 is greater than the signal at the inverting input port of amplifier 510 by more than a predetermined voltage amount, the output of the amplifier 510 is clamped at a upper limit voltage value. Conversely, when the reference signal at the non-inverting input port of amplifier 510 is less than the signal at the inverting input port of amplifier 510 by more than a predetermined voltage amount, the output of the amplifier 510 is clamped at a lower limit voltage value. In the presently preferred embodiment, the upper limit is set by D2 and the lower limit is set by D1. Thus, the limits are a diode drop above and below the reference voltage. Under these conditions, the amplifier 510 operates as a limiter. As is known to one of ordinary skill in the art, other types of limiters and/or filters may be used instead of the amplifier 510 while remaining within the scope of the invention.

As mentioned earlier, waveform (5) is used to offset the output of amplifier 510 into the lower limit voltage value when waveform (5) is high. Thus, the high value of waveform (5) is set so as to force the output of amplifier 510 into the lower limit voltage value irrespective of a size of a transition on waveform (1). Resistor R3 is connected between the output of comparator 520 and the inverting input port of amplifier 510, and the value of R3 determines the magnitude of the offset and therefore controls a threshold beyond which the amplitude of waveform (1) must exceed before the output of amplifier 510 comes out of the lower limit condition.

By the feeding back of the output of the digitizer 500, that is, the output of comparator 520, to the input of the digitizer 500, that is, the inverting input port of the amplifier 510, the digitizer 500 only allows a peak of waveform (1) in the correct polarity that will bring the amplifier 510 out of its (upper or lower) limit condition. In other words, a proper differentiated signal (i.e., the input to the digitizer 500) should never have two negative transitions or two positive transitions in a row.

The digitizer 500 provides for the inhibition of a second and subsequent transitions of an improper sequence of two or more positive transitions of the input differentiated signal. Additionally, the digitizer 500 provides for the inhibition of a second and subsequent transitions of an improper sequence of two or more negative transitions of the input differentiated signal. Thus, the digitizer 500 effectively ignores the second (or more) improper transition(s), until a correct (i.e., opposite) transition is detected.

In the preferred embodiment, the level of the upper and lower limits is set not only by the characteristics of amplifier 510, but also by diode D1 (i.e., one diode voltage drop below the reference voltage, 2.5 volts). This limit level can be made to any value other than a diode drop with various other limiter topologies so as to utilize the full amplifier voltage swing capability, as is known to one of ordinary skill in the art.

When a peak voltage on waveform (1) of sufficient amplitude and positive polarity occurs, such as at point 610 in FIG. 6, waveform (2) will come out of the upper limit condition, allowing digitization of waveform (2) by comparator 520.

While the output of comparator 520 (that is, waveform (5)) is in the high state, waveform (3) will be offset from waveform (4) by a value determined by resistor R4 and resistor R5. As a peak occurs on waveform (2), as indicated by 680 in FIG. 6, there is a phase lag between waveform (3) and waveform (4), which is determined by the combination of resistor R6 and capacitor C2. At a time shortly after waveform (2) reaches its peak value, the respective amplitudes of waveform (3) and waveform (4) will be equal (due to the phase shift caused by resistor R6 and capacitor C2), and thus waveform (5) will change to the low (black) state. At this instant, a transient positive hysteresis, due to capacitor C3, is applied to waveform (3) to ensure a stable transition. Diodes D3 and D4 prevent capacitor C3 from causing a phase lag at waveform (3) which would otherwise tend to cancel the phase lag at waveform (4).

Once in the low state, waveform (5) offsets the output of amplifier 510 into the upper limit voltage value (set in part by diode D2). Now, only a peak voltage on waveform (1) of sufficient amplitude and positive polarity will bring waveform (2) out of the upper limit, thereby allowing the output of comparator 520 to change back to the high state. Thus, as shown in FIG. 6, the noise spikes, indicated by 640 and 650 in FIG. 6, will also be ignored by the digitizer 500, since they do not rise to a sufficient threshold value to cause the digitizer 500 to perform a digitization of the input signal.

As seen in FIG. 6, the false positive transition 620 (which occurs after the true positive transition 615, with no negative transition therebetween) in the waveform (1) will be ignored by the digitizer 500 even if the amplitude of the noise/false transition is above the threshold value. This happens because the false transition 620 occurs while the output of amplifier 510 is in the lower limit condition, and thus cannot be pushed into a lower value than the lower limit voltage.

Referring now to FIG. 5, diode D5, diode D6, resistor R7 and capacitor C4 are provided between the output of comparator 520 and the inverting input port of comparator 520, and together provide a restore-to-white circuit 530 for the digitizer 500. This restore-to-white circuit 530 sets up the digitizer 500 for a new scan, whereby the waveform (5) is reset back to the high (i.e., white) state in the event that waveform (5) remains in the black state for a period of time greater than a preset time as determined by R7 and C4.

One advantage of the digitizer 500 is that it will change state only on a signal of the correct (i.e., opposite) polarity. This effectively cuts the peak-to-peak noise level in half, allowing for more accurate peak detection of lower level signals. This also eliminates the need for additional bar validation circuitry for a barcode scanner. Another advantage of the digitizer 500 is that the peak signal being digitized can swing from the lower limit to the upper limit of amplifier 510, thereby providing a peak-to-peak signal swing capability that exceeds the power supply. This is especially useful in systems required to operate on a lower supply voltage (e.g., 3 volts), and simplifies or eliminates the need for automatic gain control due to the increased dynamic range of the digitizer.

While a preferred embodiment has been described herein, modification of the described embodiment may become apparent to those of ordinary skill in the art, following the teachings of the invention, without departing from the scope of the invention as set forth in the appended claims.

What is claimed is:

1. A digitizer for a barcode scanner, the barcode scanner configured to provide a differentiated signal corresponding to a scanned data symbol, the digitizer comprising:

an amplifier having a first input port configured to receive a reference voltage, and a second input port configured to receive the differentiated signal and a feedback signal, the amplifier including an output port for providing an output signal corresponding to a difference between the reference voltage and a sum of the feedback signal and the differentiated signal, wherein the amplifier is configured to provide a first voltage as the output signal when the difference is greater than a predetermined voltage, and the amplifier is configured to provide a second voltage as the output signal when the difference is less than the predetermined voltage;

a filter coupled to receive the output signal from the amplifier and configured to provide a filtered signal; and a comparator having a first port configured to receive the output signal from the amplifier and a second port connected to receive the filtered signal from the filter, wherein, based on a comparison of an amplitude of the filtered signal and an amplitude of the output signal, the comparator outputs one of a third and fourth voltage level as the feedback signal.

2. The digitizer according to claim 1, further comprising a restore-to-white circuit connected between an output port of the comparator and the second port of the comparator, the restore-to-white circuit resetting the feedback signal to the fourth voltage level for a next scan of the barcode scanner, after a current scan has been digitized.

3. The digitizer according to claim 1, wherein the differentiated signal corresponds to a first derivative signal.

4. The digitizer according to claim 1, wherein the differentiated signal corresponds to a second derivative signal.

5. The digitizer according to claim 1, wherein the filtered signal corresponds to the output signal delayed in phase by a predetermined amount.

6. The digitizer according to claim 5, wherein the filter corresponds to a resistor having a resistance value R connected in series to a capacitor having a capacitance value C, and wherein the predetermined amount is due to a time constant RC.

7. The digitizer according to claim 1, wherein the feedback signal corresponds to a digitized output of the digitizer.

8. A digitizer for a barcode scanner, the barcode scanner configured to provide a differentiated signal corresponding to a scanned data symbol, the digitizer comprising:
a limiter circuit having a first input port configured to receive a reference voltage, and a second input port configured to receive the differentiated signal and a feedback signal, the limiter circuit including an output port for providing an output signal corresponding to a difference between the reference voltage and a sum of the feedback signal and the differentiated signal,
wherein the limiter circuit is configured to provide a first voltage as the output signal when the difference is greater than a predetermined voltage, and the limiter circuit is configured to provide a second voltage as the output signal when the difference is less than the predetermined voltage;
a filter coupled to receive the output signal from the limiter circuit and configured to provide a filtered signal; and
a comparator having a first port configured to receive the output signal from the limiter circuit and a second port connected to receive the filtered signal from the filter, wherein, based on a comparison of an amplitude of the filtered signal and an amplitude of the output signal, the comparator outputs one of a third and fourth voltage level as the feedback signal.

9. The digitizer according to claim 8, further comprising a restore-to-white circuit connected between an output port of the comparator and the second port of the comparator, the restore-to-white circuit resetting the feedback signal to the fourth voltage level for a next scan of the barcode scanner, after a current scan has been digitized.

10. The digitizer according to claim 8, wherein the differentiated signal corresponds to a first derivative signal.

11. The digitizer according to claim 8, wherein the differentiated signal corresponds to a second derivative signal.

12. The digitizer according to claim 8, wherein the filtered signal corresponds to the output signal delayed in phase by a predetermined amount.

13. The digitizer according to claim 12, wherein the filter corresponds to a resistor having a resistance value R connected in series to a capacitor having a capacitance value C, and wherein the predetermined amount is due to a time constant RC.

14. The digitizer according to claim 8, wherein the feedback signal corresponds to a digitized output of the digitizer.

15. A digitizer, comprising:
a first circuit configured to receive a differentiated signal and to provide a filtered output, the first circuit being operable in a first and second mode;
a second circuit connected to receive the filtered output from the first circuit and to provide a digitized output based on the filtered output; and
a third circuit connected to the first circuit and connected to receive the digitized output from the second circuit, the third circuit configured to switch the first circuit between the first mode and the second mode; and
wherein, in the first mode, the first circuit is responsive to an initial transition of a first polarity and ignores subsequent transitions of the first polarity, and
wherein, in the second mode, the first circuit is responsive to an initial transition of a second polarity and ignores subsequent transitions of the second polarity, and
wherein the third circuit switches the first circuit between the first mode and the second mode in accordance with a transition of the digitized output.

16. A method for digitizing a differentiated return signal from a scanned barcode symbol, comprising the steps of:
a) subtracting from a reference signal a sum signal in order to obtain an output signal, the sum signal corresponding to the differentiated return signal added to a feedback signal, the output signal being limited to a value between an maximum value and a minimum value;
b) phase delaying the output signal in order to obtain a phase-delayed signal; and
c) comparing the phase-delayed signal to the output signal in order to output the feedback signal having one of a first signal level and a second signal level,
wherein improper transitions of the differentiated return signal are ignored and not digitized due to the feedback signal forcing the output signal to one of the maximum value and the minimum value.

17. The method according to claim 16, wherein the differentiated return signal corresponds to a first derivative of the scanned return signal initially received by a photodetector.

18. The method according to claim 16, wherein the differentiated return signal corresponds to a second derivative of the scanned return signal initially received by a photodetector.

19. The method according to claim 16, wherein the phase-delayed signal corresponds to the output signal delayed in phase by a set amount.

20. The method according to claim 19, wherein the phase-delaying step b) is performed by a resistor having a resistance value R connected in series to a capacitor having a capacitance value C, and wherein the set amount is due to a time constant RC.

21. The method according to claim 16, wherein the feedback signal corresponds to the digitized differentiated return signal.

22. A method of digitizing a differentiated signal having transitions of a first and second polarity, the method comprising the steps of:

a) detecting a transition in the differentiated signal;
b) determining whether a polarity of the transition corresponds to the first polarity or the second polarity;
c) providing a digitized output in accordance with the detected transition; and
d) ignoring subsequent transitions in the differentiated signal having a same polarity as the polarity determined in the step b).

\* \* \* \* \*